(12) United States Patent
Fischer

(10) Patent No.: US 6,758,491 B2
(45) Date of Patent: Jul. 6, 2004

(54) SAFETY ARRANGEMENT FOR MOTOR VEHICLES

(75) Inventor: Jochem Fischer, Marbach (DE)

(73) Assignee: Benteler Automobiltechnik GmbH, Paderborn (DE)

(*) Notice: Subject to any disclaimer, the term of this patent is extended or adjusted under 35 U.S.C. 154(b) by 0 days.

(21) Appl. No.: 10/202,460

(22) Filed: Jul. 24, 2002

(65) Prior Publication Data

US 2003/0020265 A1 Jan. 30, 2003

(30) Foreign Application Priority Data

Jul. 24, 2001 (DE) .......................................... 101 35 902

(51) Int. Cl.[7] .............................................. B60R 21/24
(52) U.S. Cl. ................................ 280/730.2; 280/728.1; 280/728.2; 280/734.1; 280/782; 280/784; 296/35.2; 296/189
(58) Field of Search ......................... 280/730.1, 730.2, 280/728.2, 782, 784, 728.1; 296/35.2, 189

(56) References Cited

U.S. PATENT DOCUMENTS

| | | | | |
|---|---|---|---|---|
| 4,536,008 A | * | 8/1985 | Brown, Jr. ................ 280/730.1 |
| 4,846,368 A | * | 7/1989 | Goetz ............................ 222/3 |
| 5,310,214 A | * | 5/1994 | Cuevas ........................ 280/729 |
| 6,164,688 A | * | 12/2000 | Einsiedel et al. ......... 280/730.2 |
| 6,176,544 B1 | * | 1/2001 | Seksaria et al. ........ 296/203.02 |
| 6,213,503 B1 | * | 4/2001 | Zimbrich et al. ........... 280/736 |
| 6,336,654 B1 | * | 1/2002 | Stein et al. .............. 280/730.2 |

FOREIGN PATENT DOCUMENTS

| | | | |
|---|---|---|---|
| DE | 19758024 | * | 1/1996 |
| DE | 19734487 | * | 3/1998 |
| DE | 197 34 487 | | 3/1998 |
| DE | 297 18 205 | | 4/1998 |
| DE | 29718205 | * | 4/1998 |
| DE | 29823008 | * | 4/1999 |
| DE | 197 58 024 | | 7/1999 |
| EP | 0924122 | * | 11/1998 |

* cited by examiner

Primary Examiner—Michael J. Carone
Assistant Examiner—John Richardson
(74) Attorney, Agent, or Firm—Henry M. Feiereisen

(57) ABSTRACT

A safety arrangement for a motor vehicle includes an airbag disposed in an area of a roof frame of a vehicle body which includes an "A" pillar, a "B" pillar, and a "C/D" pillar. A connecting tube is coupled to the airbag and extends in the area of the roof frame from the "A" pillar to the "C/D" pillar to conduct pressure gas from a pressure gas source to the airbag. The connecting tube is so configured as to provide stiffening for increasing a lateral rigidity of the roof frame and is firmly secured at least to the "A" pillar and the "C/D" pillar.

11 Claims, 3 Drawing Sheets

SAFETY ARRANGEMENT FOR MOTOR VEHICLES

CROSS-REFERENCES TO RELATED APPLICATIONS

This application claims the priority of German Patent Application Serial No. 101 35 902.0, filed Jul. 24, 2001, pursuant to 35 U.S.C. 119(a)–(d), the subject matter of which is incorporated herein by reference.

BACKGROUND OF THE INVENTION

The present invention relates, in general, to a safety arrangement for motor vehicles.

Side airbag systems are currently installed in motor vehicles to protect passengers in the event of a side impact collision or rollover. The side airbag systems are arranged in the area of the roof frame of the vehicle body and are inflated, when activated, by pressure gas released from a pressure gas source situated remote to the airbag. Supply of pressure gas to the side airbag system from a pressure gas source is realized through incorporation of lance-like fill pipes, which connect the pressure gas source with the airbag system and extend along the roof frame of the motor vehicle. The pressure gas may be arranged at various parts of the vehicle, in particular in the lower zone of the "A" pillar, "B" pillar or "C" or in the area of the wheel well, as described, for example, in German patent publication DE 197 58 024 A1. This publication also discloses the use of fill pipes of different configuration to extend substantially over the entire length of the vehicle, i.e., from the "A" pillar to the "C/D" pillar and in the lateral roof area of the motor vehicle.

Conventional side airbag systems suffer shortcomings because of the need for additional installation space to accommodate the fill pipes or connections between the pressure gas source and the air bag in the area of the roof frame. Moreover, the connections are exposed to great impact stress as the pressure gas source is activated. As a consequence, the connections require a minimum wall thickness. On the other hand, connections with greater wall thickness result in increased overall weight of the motor vehicle, so that fuel consumption is higher, accompanied by an adverse effect on the environment.

It would therefore be desirable and advantageous to provide an improved safety arrangement for motor vehicles which obviates prior art shortcomings and which exploits the advantages of a side airbag system while additionally enhancing the passive safety of passengers.

SUMMARY OF THE INVENTION

According to one aspect of the present invention, a safety arrangement for a motor vehicle includes an airbag, which is disposed in an area of a roof frame of a vehicle body including an "A" pillar, a "B" pillar, and a "C/D" pillar, and a connecting tube coupled to the airbag and extending in the area of the roof frame from the "A" pillar to the "C/D" pillar, wherein the connecting tube is configured to provide a stiffening for increasing a lateral rigidity of the roof frame and is firmly secured at least to the "A" pillar and the "C/D" pillar.

The present invention resolves prior art problems by providing and so configuring the connecting tube as to assume two functions, namely, conduction of pressure gas to the airbag, and providing a stiffening effect of the roof frame. This dual function of the connecting tube significantly enhances the lateral rigidity of the roof frame. The increase in lateral rigidity in the roof frame zone may amount to about 15%.

The stiffening effect of the connecting tube is not only realized by the arrangement of the connecting tube in the roof frame area but also by the firm fixation of the ends of the connecting tube to the "A" pillar and the "C/D" pillar. The fixation of the connecting tube to the "A" pillar and "C/D" pillar provides an abutment for forces acting in the area of the roof frame.

A safety arrangement according to the present invention allows a simpler configuration of the roof frame through smaller sized cross sections while still realizing a constant stiffness, and thus compensation of the added weight as a consequence of the arrangement of the connecting tube. Thus, the airbag can be reliably supplied with pressure gas, while the stiffness in the roof area and the vehicle weight can be kept constant, without increase in the vehicle weight and accompanying adverse effects.

According to another feature of the present invention, the connecting tube may have at least one tube portion which, in the area of the "A" pillar and/or "C/D" pillar, is in flat engagement with the "A" pillar and/or "C/D" pillar. The flat engagement or even form-fitting contact of tube portions of the connecting tube upon the "A" pillar and/or "C/D" pillar has the advantage that the connecting tube is prevented from buckling during rollover. In the event of rollover, generated forces normally act suddenly, so that a buckling of the connecting tube would prevent thrust forces to be absorbed by the "A" pillar. As a result, the connecting tube would contribute only minimally to an increase of the lateral rigidity in the roof area.

According to another feature of the present invention, there is provided a securement in a lower zone of the "A" pillar for form-fitting retention of the connecting tube. The form-fitting retention may be realized by providing a guide with a trough-like groove for receiving a portion of the connecting tube so as to counteract an undesired buckling of the connecting tube in longitudinal direction of the connecting tube and also in circumferential direction. Of course, the provision of a guide is optional in order to realize the form-fitting retention. Rather, it may be conceivable to configure the "A" pillar and the "C/D" pillar in such a manner that, at least over predetermined portions, a form-fitting retention of the connecting tube is realized similar-to the previously described securement of the connecting tube via a guide.

According to another feature of the present invention, the connecting tube may have a bent configuration in conformity to a bent configuration of the securement, whereby a force acting in a longitudinal direction of the "A" pillar upon the connecting tube in a direction of the securement is introducible into the bent securement. This feature is based on the recognition that the force acting from the roof frame on the connecting tube can be introduced, in principle, through circumferential clamping of the connecting tube in the area of securement to the "A" pillar and the "C/D" pillar as abutment. An bent securement and a complementary bent connecting tube have the added effect that the connecting tube cannot slip through the guide without plastic deformation. Through respective configuration of the securement in the area of the bent section, it is even possible to substantially omit the need for clamping elements because an impact stress can be absorbed solely by the bent section in the securement.

While the securement of the connecting tube to the "A" pillar and "C/D" pillar significantly contributes to the functionality of the safety arrangement according to the present invention, it is also possible to provide a bracket for mounting the connecting tube in the area of the "B" pillar to the roof frame. In this way the lateral rigidity is further enhanced. In particular, the securement in the area of the "B" pillar prevents a relative movement of the connecting tube transversely to the traveling direction of the motor vehicle, and the tendency of the relatively long connecting tube to oscillate is suppressed.

According to another feature of the present invention, the connecting tube may have a forward tube portion, which extends from the "A" pillar to the "B" pillar, and rearward tube portion, which extends from the "B" pillar to the "C/D" pillar, wherein both tube portions are linked together in the area of the "B" pillar. Of course, it is equally possible to configure the connecting tube of single-piece construction so as to extend from the "A" pillar to the "C/D" pillar. In order to prevent a buckling of the connecting tube in the area of the "B" pillar, forward and rearward tube portions of the connecting tube are linked together in the area of the "B" pillar. The linkage need not necessarily be gas-permeable. It may also be conceivable to feed the forward tube portion from one gas pressure source, for example in the "A" pillar, and to feed the rearward tube portion of the connecting tube from a further gas pressure source, for example in the "C" pillar.

According to another feature of the present invention, there may be provided a bracket for securing the connecting tube in the area of the "B" pillar to the roof frame, wherein the forward tube portion has a trailing end and the rearward tube portion has a leading end, with the trailing end and the leading end being mounted by the bracket to the roof frame. The attachment of trailing and leading ends of the respective tube portions to the vehicle body removes a potential weak point at the joint between the neighboring ends of the tube portions.

Upon execution of a quasi static roof crushing test, in which the roof frame area of the motor vehicle, positioned on a fixed base, is loaded from outside at an angle of 25° relative to the vertical, it has been shown that the lateral rigidity in the roof area can be increased up to 15% compared to a roof frame without tube.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
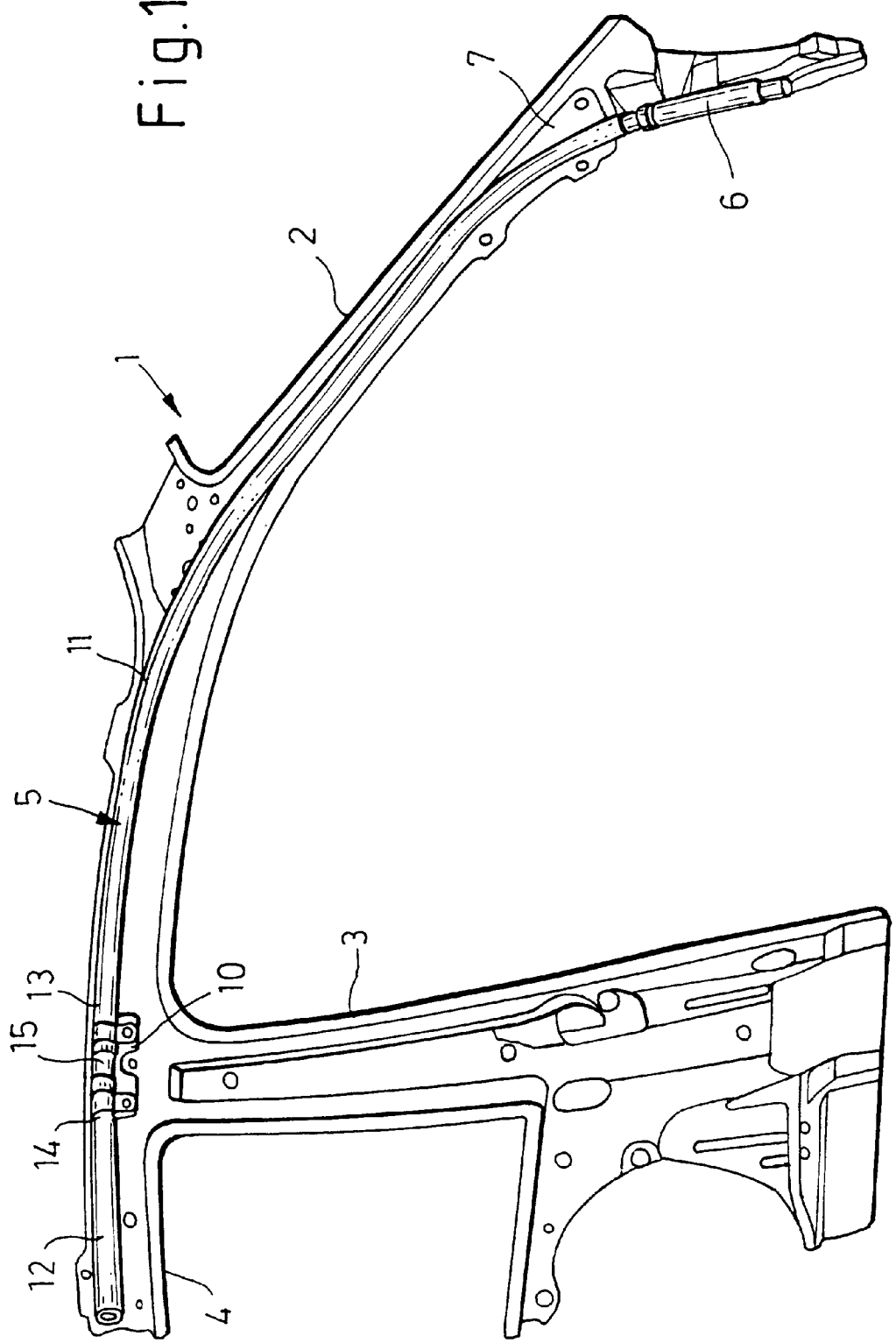
FIG. 1 is a schematic view of a section of a side structure panel of a motor vehicle body between the "A" pillar and the "B" pillar, as viewed from the vehicle interior, having incorporated therein a safety arrangement according to the present invention.

Throughout all the Figures, same or corresponding elements are generally indicated by same reference numerals.

Figure 2:
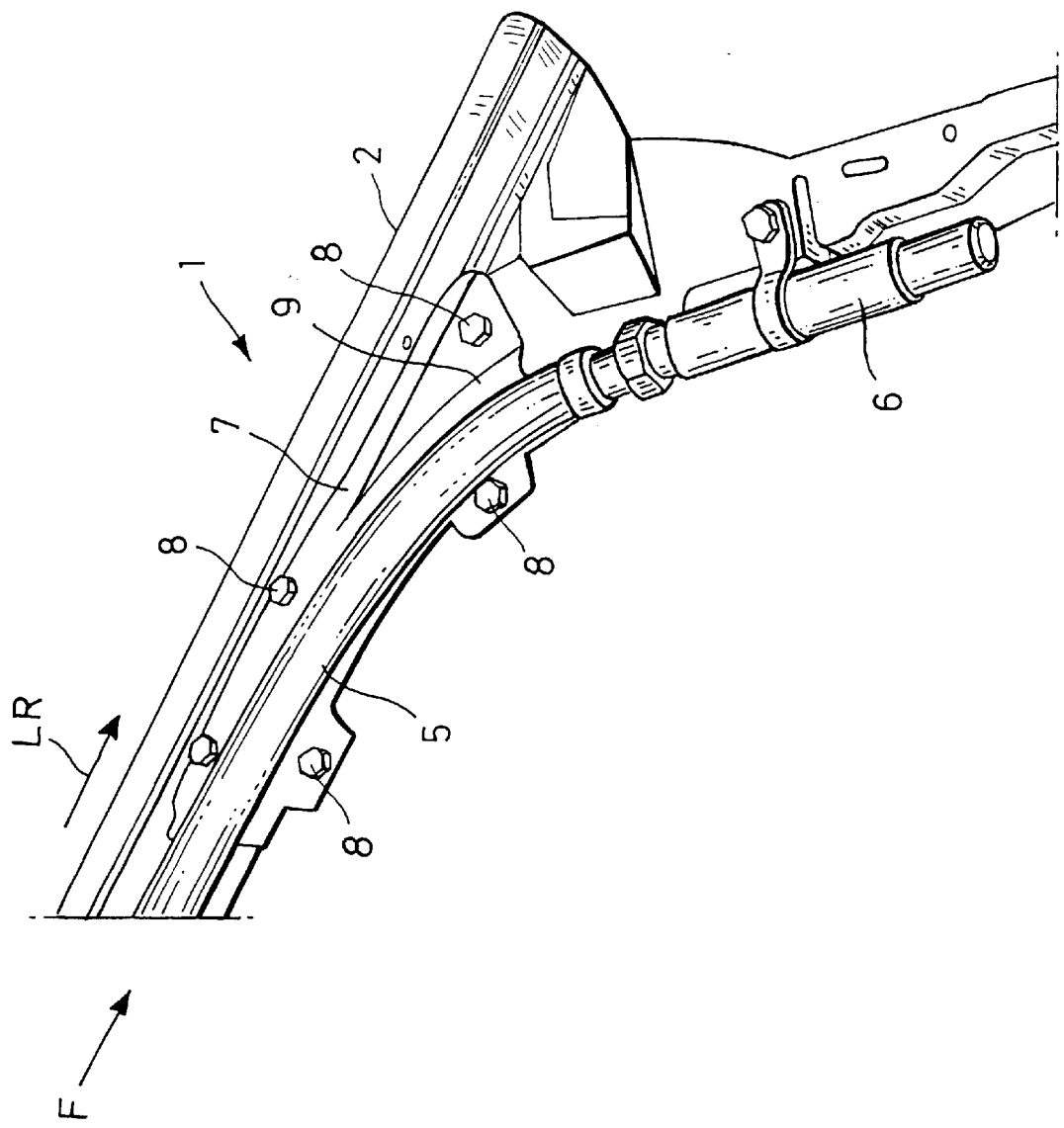
FIG. 2 is a detailed cutaway view, on an enlarged scale, of the vehicle body in the roof area to show the securement of a connecting tube to the "A" pillar.

Turning now to the drawing, and in particular to FIG. 1, there is shown a schematic view of a section of a side structure panel 1 of a motor vehicle body, as viewed from the vehicle interior. The side structure panel 1 extends from the windshield or "A" pillar 2 via a center or "B" pillar 3 to a rear or C/D pillar, not shown here. The "A" pillar 2 terminates in a roof frame 4 which extends to the "C/D" pillar. Extending coextensively with the course of the "A" pillar 2 and the roof frame 4 is a connecting tube 5 which faces inwardly toward the vehicle interior and is secured to the "A" pillar 2 and the roof frame 4. Although not shown in FIG. 1, the connecting tube 5 extends further to the "C/D" pillar and is secured via the "C/D" pillar to the side structure panel 1. The connecting tube 5 assumes hereby a dual function: The first function involves conduction of pressure gas from a pressure gas source 6, located in a lower zone of the "A" pillar 2, as also shown in FIG. 2, to a side airbag (not shown) arranged in the area of the roof frame 4. The second function involves stiffening of the roof frame 4 for increasing the lateral rigidity of the roof frame 4 as well as of the upper portion of the entire side structure panel 1.

As shown in FIGS. 1 and 2, a securement in the form of a plate-shaped guide 7 is placed in the lower region of the "A" pillar 2 for restraining the connecting tube 5. In this way, a force F acting in longitudinal direction LR of the "A" pillar 2 upon the connecting tube 5 can be absorbed. The guide 7 is bolted by several screw fasteners 8 to the "A" pillar 2 and extends approximately along a third of the length of the "A" pillar 2. The guide 7 is so configured as to realize a flat engagement between the guiding plate 7 and the connecting tube 5. The configuration of the connecting tube 5 at the lower end of the "A" pillar 2 conforms hereby substantially to the contour of the door frame and is thus angled downwards. The "A" pillar distal end of the connecting tube 5 is coupled to the replaceable gas pressure source 6 via a suitable screw connection 20, as shown in particular in FIG. 2. The guide 7 is designed to conform to the bent configuration of the connecting tube 5 and is formed in the area of the bent portion with a rib-like elevation 9 to form a trough for support of the outer radius of the bent connecting tube 5. Thrust forces introduced by the force F via the connecting tube 5 into the guide 7 are hereby absorbed by the elevation 9 and transmitted via the screw fasteners 8 into the "A" pillar 2 of the side structure panel 1.

Although not shown in detail, the connecting tube 5 is secured to the "C/D" pillar by a guide in a same manner as described in conjunction with the securement of the connecting tube 5 to the "A" pillar 2.

As shown in FIG. 1, the connecting tube 5 is also secured above the "B" column 3 via a bracket 10 which is bolted to the roof frame 4. In the nonlimiting example of FIG. 1, the connecting tube 5 is divided into a forward tube portion 11 and a rearward tube portion 12. The forward tube portion 11 extends from the "A" pillar 2 via the roof frame 4 to the bracket 10 above the "B" pillar 3 and terminates in a trailing end 13, whereas the rearward tube portion 12 extends from the bracket 10 above the "B" pillar 3 to the, not shown, "C/D" pillar and terminates in a leading end 14. The bracket 10 embraces the trailing end 13 of the forward tube portion 11 as well as the leading end 14 of the rearward tube portion 12. Both tube portions 11, 12 are fluidly coupled together in the area of the bracket 10 by a connection piece 15.

Figure 3:
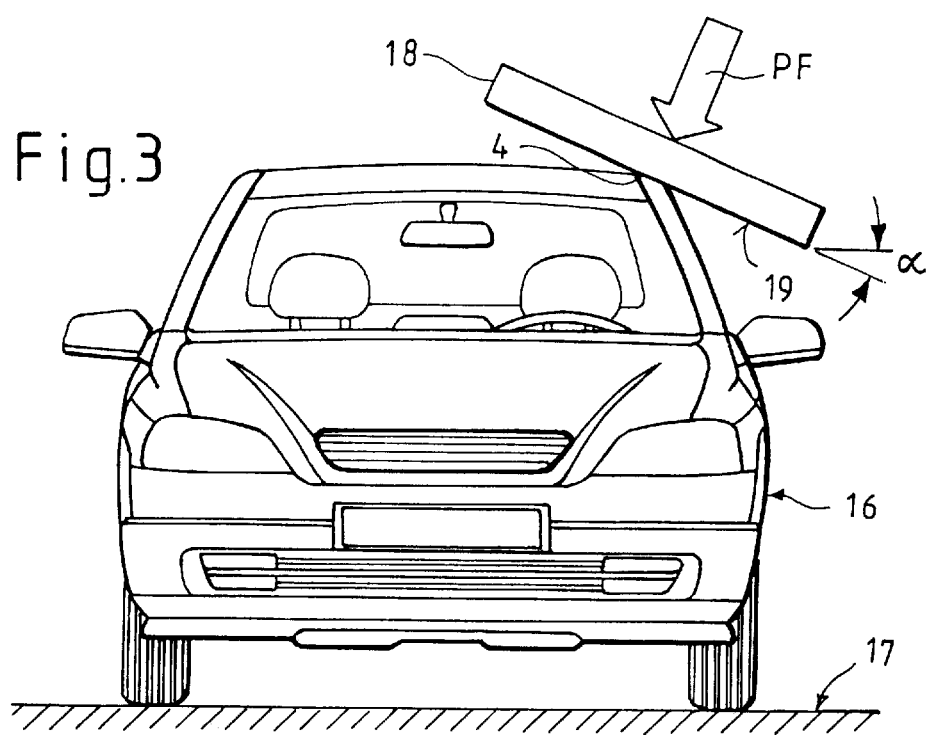
FIG. 3 is a schematic view of a motor vehicle body, having incorporated therein a safety arrangement according to the present invention, and subjected to a quasi static roof crushing test.
Figure 4:
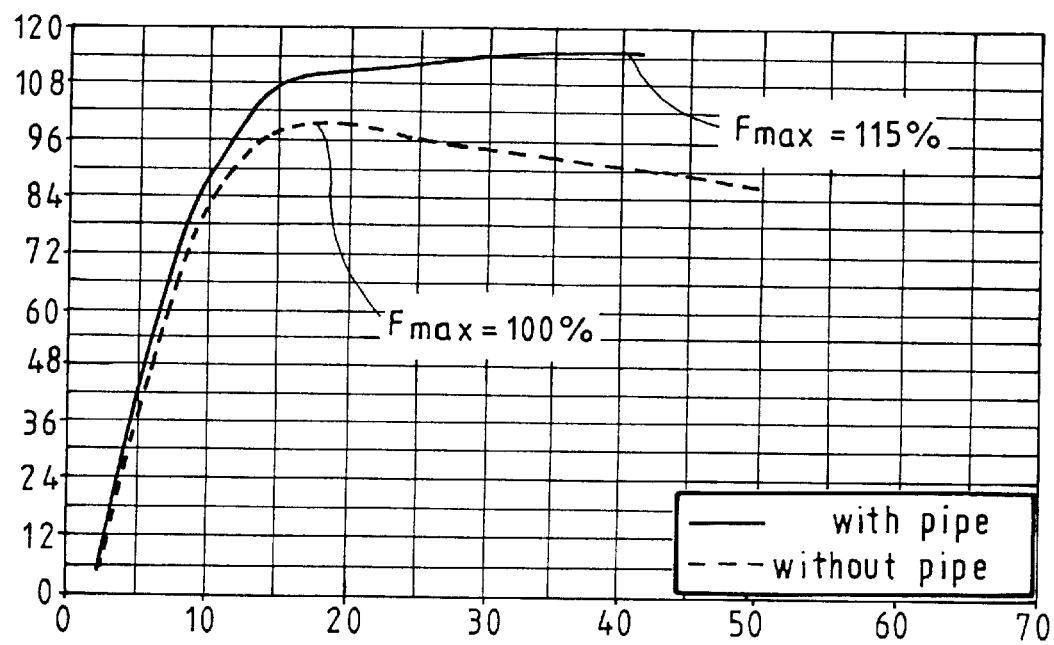
FIG. 4 is a graphical illustration of a force-path diagram of a roof crushing test, plotting the displacement of the roof frame in millimeter as a function of the ratio in percent of the force being applied and the maximum force of a roof frame without connecting tube.

Turning now to FIG. 3, there is shown a schematic view of a motor vehicle body subjected to a quasi-static roof crushing test. Hereby, a motor vehicle 16, being tested, is placed upon a solid base 17 while a testing device 18 applies a force in the direction of arrow PF onto the area of the roof frame 4 of the motor vehicle 16. The surface area 19 of the testing device 18, acting on the roof frame 4 is inclined at an angle a of 25° with respect to the horizontal. The result of the roof crushing test with this testing device 18 is illustrated in FIG. 4 by way of a force-path diagram. The abscissa of the diagram denotes the displacement of the roof frame 4 in millimeters, whereas the ordinate denotes the ratio in percent of the force being applied and the maximum force of a roof frame 4 without connecting tube 5. The dotted line displays the result for a motor vehicle without connecting tube in the roof frame, whereas the continuous line displays the result for a motor vehicle with connecting tube 5 in the roof frame 4. As indicated by the dotted line, the maximum of the force to be applied upon a roof frame without connecting tube 5 is indicated in FIG. 4 by $F_{max}$=100%, whereby $F_{max}$ is reached at a displacement of about 17.5 mm.

Compared to a roof frame without connecting tube, a safety arrangement with connecting tube 5 in the roof frame 4 in accordance with the present invention results in a measurement of a higher force which reaches a magnitude of about 115% at a displacement of about 40 mm. Unlike in a roof frame without connecting tube, the force profile does not drop continuously at relatively low depth of penetration but rather ascends continuously. As a result, the lateral rigidity in the roof area is significantly higher through the incorporation of the connecting tube 5 compared to a motor vehicle without connecting tube.

While the invention has been illustrated and described as embodied in a safety arrangement for motor vehicles, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A safety arrangement for a motor vehicle, comprising
   an airbag disposed in an area of a roof frame of a vehicle body which includes an "A" pillar, a "B" pillar, and a "C/D" pillar;
   a connecting tube coupled to the airbag and extending in the area of the roof frame from the "A" pillar to the "C/D" pillar, wherein the connecting tube is configured to provide a stiffening for increasing a lateral rigidity of the roof frame and is firmly secured at least to the "A" pillar and the "C/D" pillar; and,
   a securement placed at a lower zone of the "A" pillar for form-fitting retention of the connecting tube, wherein the securement is a plate-shaped guide having a trough-like groove for receiving a bent portion of the connecting tube.

2. The safety arrangement of claim 1, wherein the connecting tube has at least one tube portion which, in the area of at least one of the "A" pillar and "C/D" pillar, is in flat engagement with at least one of the "A" pillar and "C/D" pillar.

3. The safety arrangement of claim 1, wherein the connecting tube has a bent configuration in correspondence to a bent configuration of the securement, whereby a force acting in a longitudinal direction of the "A" pillar upon the connecting tube in a direction of the securement is introducible into the bent securement.

4. The safety arrangement of claim 1, and further comprising a bracket for mounting the connecting tube in the area of the "B" pillar to the roof frame.

5. The safety arrangement of claim 1, wherein the connecting tube has a forward tube portion, which extends from the "A" pillar to the "B" pillar, and rearward tube portion, which extends from the "B" pillar to the "C/D" pillar, wherein the forward and rearward tube portions are connected together in the area of the "B" pillar.

6. The safety arrangement of claim 5, and further comprising a bracket for mounting the connecting tube in the area of the "B" pillar to the roof frame, wherein the forward tube portion has a trailing end and the rearward tube portion has a leading end, said trailing end and said leading end being mounted by the bracket to the roof frame.

7. The safety arrangement of claim 5, and further comprising a first pressure gas source to feed the forward tube portion with pressure gas, and a second pressure gas source to feed the rearward tube portion with pressure gas.

8. The safety arrangement of claim 5, wherein the first gas pressure source is linked to the forward tube portion of the connecting tube in the area of the "A" pillar, and the second gas pressure source is linked to the rearward tube portion of the connecting tube in the area of the "B" pillar.

9. The safety arrangement of claim 1, and further comprising a pressure gas source, detachably linked to the connecting tube, for filling the airbag with a pressure gas.

10. The safety arrangement of claim 1, wherein the plate-shaped guide is bolted to the "A" pillar.

11. The safety arrangement of claim 1, wherein the guide is formed in the area of the bent portion with a rib-like elevation to form a trough for support of an outer radius of the bent portion of the connecting tube.

* * * * *